F. O. CURTIS.
SCREW MAKING MACHINE.
APPLICATION FILED SEPT. 3, 1907.
905,991.
Patented Dec. 8, 1908.
2 SHEETS—SHEET 1.
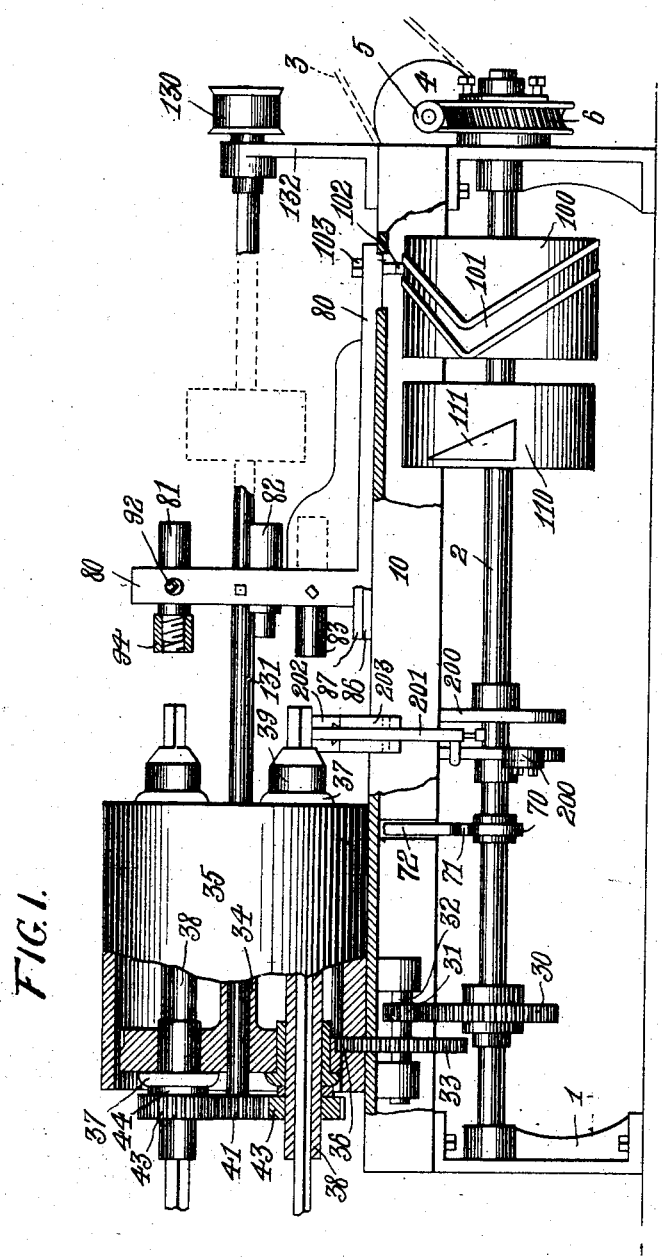

F. O. CURTIS.
SCREW MAKING MACHINE.
APPLICATION FILED SEPT. 3, 1907.
905,991.
Patented Dec. 8, 1908.
2 SHEETS—SHEET 2.
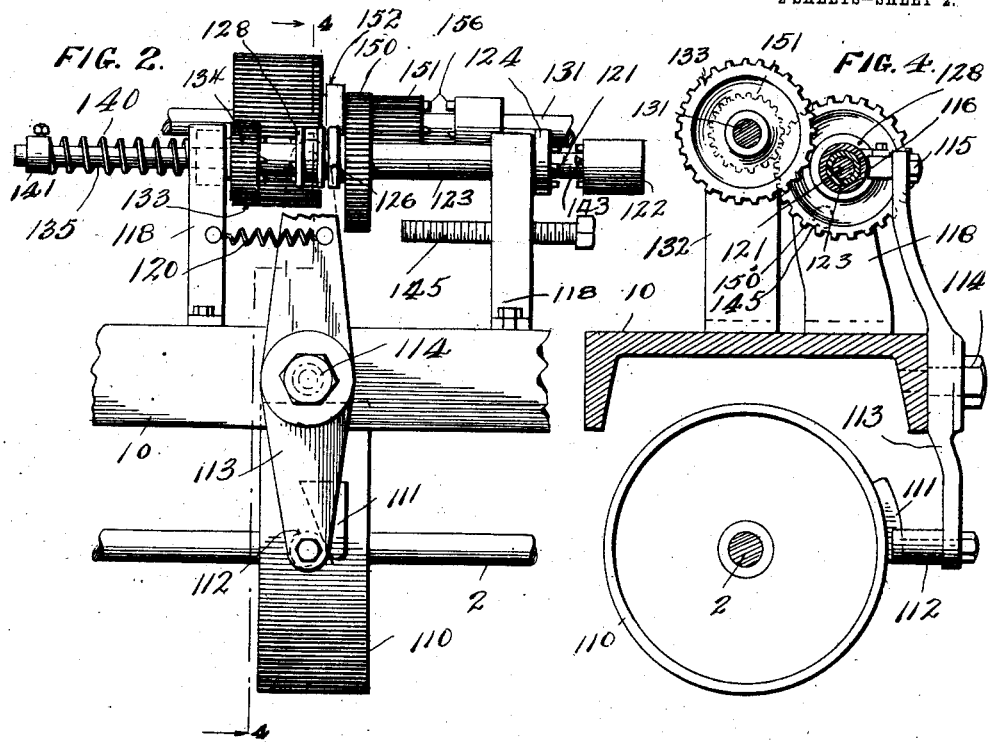
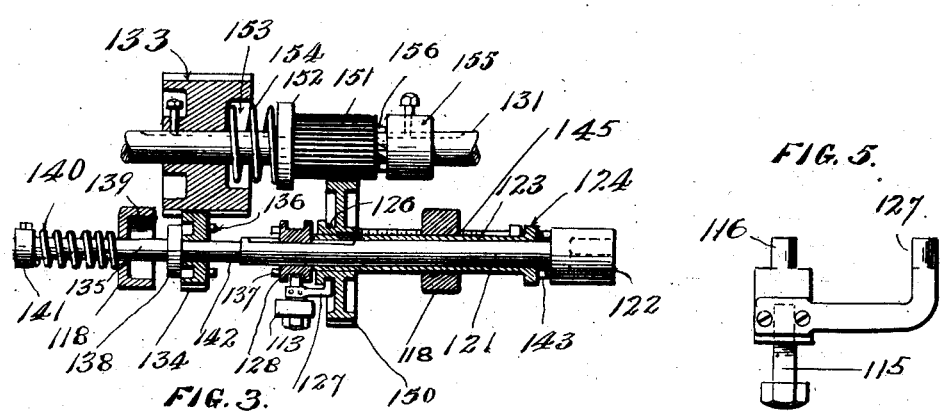
WITNESSES:
Chas. K. Davies.
Edith L. Smith
INVENTOR:
Frank O. Curtis,
by
Collamer & Co., Attorneys.

UNITED STATES PATENT OFFICE.

FRANK O. CURTIS, OF BUFFALO, NEW YORK.

SCREW-MAKING MACHINE.

No. 905,991.  Specification of Letters Patent.  Patented Dec. 8, 1908.

Application filed September 3, 1907. Serial No. 391,205.

*To all whom it may concern:*

Be it known that I, FRANK O. CURTIS, a citizen of the United States, and resident of Buffalo, Erie county, State of New York, have invented certain new and useful Improvements in Screw-Making Machines; and my preferred manner of carrying out the invention is set forth in the following full, clear, and exact description, terminating with claims particularly specifying the novelty.

This invention consists more particularly in improvements on my former patent in the same line, numbered 712506 and issued November 4, 1902; and the object of the present invention is to simplify the former construction in certain respects and increase the output of the machine. This object I accomplish by connecting the die-spindle-sleeve with the power shaft by a retarding device including differential gears and ratchet teeth between the gear on the shaft and a collar fixed thereon, and thus causing the die spindle to revolve in the same direction as, but more slowly than, the live spindle while the screw is being cut, after which it revolves in the same direction and quite rapidly in order to draw the die off of the finished screw. Hence the die can be run slower and the machine faster and its output correspondingly increased.

In the accompanying drawings—Figure 1 is a front elevation of this machine with the live spindle head partly in section and the die spindles omitted; Fig. 2 is an enlarged rear elevation of one die spindle, its guide, and the mechanism for operating it; Fig. 3 is a longitudinal sectional view of the same with the parts in a different position; Fig. 4 is a cross section on the line 4 of Fig. 2; and Fig. 5 is an enlarged detail.

In the said drawings the numeral 1 designates the base of this machine in which is mounted the main shaft 2, the latter receiving power from a belt leading to a wheel 4 connected to the said shaft by a worm 5 and worm wheel 6. Upon the base is supported the bed 10 carrying the various parts of the machine. On this shaft is mounted a driving gear 30, meshing with a smaller gear 31 on a counter-shaft 32, mounted in bearings in the bed 10, and this counter-shaft carries a larger gear 33, which extends upward through the case 35 of the live-spindle head 34 and engages teeth 36 thereon. Such head turns within the case, and in the present machine it is constructed like a spool in whose ends are fixed boxes 37, in which are mounted live-spindles 38, each having a chuck 39, as usual. The spindles are turned by power applied to a pulley 130 on a power shaft 131 which leads through the hub of the spindle head 34 and carries a gear 41, the latter meshing with a planetary series of gears 43 of which each has a collar 44 for turning its spindle within its box.

Suitable mechanism (not shown) is employed for locking and releasing the head 34 within the case 35 at proper times; and this mechanism is operated by a lever 72 leading downward through the case and moved by a cam face 71 on a disk 70 which is mounted on the main shaft. Cut-off knives 202 are mounted in guides 203 on the bed, and operated at proper times by levers 201 which are tripped by a cam or cams 200 on the main shaft. The dead or tool spindles 81 and 82, and a third member which is a stop 83, are held by set screws 92 in a slide 80 which is mounted for longitudinal reciprocation on the bed and guided thereon by a track 86 which may have gibs 87. The mechanism for moving this slide consists of a cam 100 having cam faces 101 between which stands a roller 102 at the lower end of a bolt 103 in the slide 80 and passing through a slot in the bed. 110 is a cam wheel fast on the shaft 2 and having a cam face 111 on its periphery properly located to strike a roller 112 on the lever 113 pivoted at 114 to the bed. The upper end of this lever is pivoted at 115 to a fork 116 which loosely engages a groove in a clutch member 128; and the roller is held against the cam by a spring 120 which here leads to one of two standards 118. Mounted for longitudinal and rotary movement in the standards is a die spindle 121 having a die holder 122 at its inner end. Near the latter the spindle extends loosely through a long sleeve 123, and the sleeve passes through the inner standard 118 and has an integral head 124 at its inner end. Upon the other end of this sleeve is secured a gear 150 whose hub 126 has a groove engaged by a hook 127 projecting from said fork 116. Said clutch member 128 is splined on the spindle 121 just in rear of the sleeve 123, and its pins engage those on a gear 134 constituting the other clutch member, which gear is in constant mesh with a drum gear 133 that is fast on the power shaft 131 journaled in standards 132 rising from the bed. The gear 134 is mounted loosely on a reduced portion 135 of the spindle 121 between a shoulder 142 and a collar 138 which permit slight longitudinal movement of said gear. Continuing through said standard, the reduced portion of the spindle is surrounded by a spring 140, exerting expansive force between the said standard and a collar 141 at the extreme end of the spindle, and having a tendency to hold the latter normally retracted with the shoulder 142 against the gear 134 and the latter against the standard 118, while the collar 138 is drawn into a cavity 139 in said standard. Obviously, if the spindle is moved inward the collar 138 will cause the gear 134 to move with it and the length of the drum gear 133 will prevent the cessation of rotation. In the adjacent faces of the holder 122 and the sleeve head 124 are pins 143 having inclined engaging faces. The retarding device comprises the large gear 150 meshing with a long gear 151 mounted loosely on the shaft 131 and having a shoulder 152 which enters a pocket 153 within the drum gear 133 and rests against an expansive spring 154, the latter thereby holding the shoulder against said gear 150; a collar 155 fixed on the shaft 131 beyond the other end of the long gear 151; and ratchet teeth 156 in the adjacent ends or faces of the collar and long gear.

With the above construction of parts and about five spindles 38 (which is the number I prefer) within the head 34, the operation of my machine is as follows, the parts being properly shaped and timed so as to perform their functions in correct relation to each other and power being applied at 4 and 130, as above indicated: Bars of iron, forming the stock from which the screws are to be made, are inserted from the left in Fig. 1 one at a time through the empty spindle 38 as it is moved by the turning of the head 34 to the lowermost position, and each bar is then pushed inward until its inner end strikes the stop 83, which permits the bar to project beyond the clutch 39 for just a distance which will be the length of the finished screw. It is understood that the contour of this bar is that of the head of the finished screw, which obviates the necessity for doing more with my machine than turning the body of the screw, threading it, and then severing it with its head from the stock remaining; and it is also to be understood that the stock-bar is loosened and tightened in the chuck 39 on the lowermost spindle either by hand or by mechanism forming no part of the present invention, and therefore, not illustrated and described herein. I have also not shown the roughing-tool which is mounted in the lowermost tool-holder, nor the finishing tool which is mounted in the uppermost tool-holder 94. These turn out the body of the screw. Nor have I shown the first and second dies, which are mounted, respectively, in the upper and lower die-holders 122 and cut the thread upon said body; but it will be clear that as the blank progresses under the turning of the head the stock will move upward from the lowermost position and be operated upon in turn by the roughing tool, then the finishing-tool, and then it will pass over the top and downward at the rear, so as to be operated upon by the upper or first die and finally the lower or second die, after which the finished screw is severed and the spindle reaches the bottom position again, where the stock is fed forward for a new operation. It will be understood that while the empty lowermost spindle is being filled or the stock therein fed forward against the stop, the tools and dies are performing their work on the other material, and also that the new stock is not supplied or fed forward until the finished screw has been cut off. In order to have this work performed, the spindle-driving mechanism above described is rotating the five spindles at the required speed, but the fact that it rotates the spindle through which the new stock is being fed is not detrimental to the successful operation of my machine.

The cam 100 is of such size and its groove 101 so shaped that after the finished screw has been severed at the rear of the machine and the mechanism above described has turned the head 34 to bring the stock from which the screw was cut to the lowermost position, the feed of the stock commences and the cam, through the lever 103, simultaneously moves forward the die spindle. During this forward movement the roughing-tool operates on the stock which has last been fed forward, and the finishing tool operates on the material which has last been roughened, and just at the moment when these two tools have finished their work the stop strikes the projected extremity of the new piece of stock and the feed of the latter terminates, while the groove in the cam 100 has done its complete work and the retraction of the tool slide now commences. It is quite obvious that the cam groove may be so shaped as to cause this retraction to be more speedy than the forward movement. When these members have resumed their original position, the head 34 is turned forward one additional step, which obviously carries the first piece of material whose turning is finished over to the rear of the machine ready to be treated by the first die and necessarily moves the roughened piece of material up into position for operation by the finishing tool.

Having explained the manner of operating the head 34, of feeding the stock, and of roughing and finishing the body of the screw being made, it remains only to cut the thread thereon, and this is accomplished by a die of the usual construction which is mounted in the holder 122. It is to be understood that as the finished material has passed over the top of the machine, it is operated on by the die. Beginning with the parts about in the position shown in Fig. 2, as the cam 111 strikes the roller 112 the lever 113 moves the fork 116 to the right and this disengages the clutch member 128 splined on the spindle from the member 134 which is rapidly and constantly rotated by the drum 133, thereby checking the positive and rapid rotation of the spindle. The looseness of the hook 127 in the groove of the hub 126 permits the member 128 to strike the hub so that gear 150 and sleeve 123 and its head 124 are also moved to the right. This permits spring 154 to expand and long gear 151 to slide on the shaft 131 toward the collar 155. As soon as the pins 143 on the head and holder engage, the spindle commences to move forward; and when the mouth of the die engages the rotating stock, the turning of the latter tends to more tightly engage the inclined faces of said pins. This causes the spindle, head, sleeve, and gear 150 to revolve in the same direction and speed as the live spindle until the retarding device comes into play as the ratchets 156 engage, after which these parts will revolve more slowly than said live spindle because of the relative size of the engaging gears 151 and 150—the speed of the former being limited to that of the shaft 131 and the gear 150 and its connected parts rotating at about half that speed. Meanwhile the collar 138 has moved the gear 134 along on the drum 133, and the collar 141 has compressed the spring 140 against the left standard 118. The parts now stand in the position shown in Fig. 3. Just at this time the roller 112 passes off cam 111, and the spring 120 would return the parts to the position shown in Fig. 2 if it were not for the clinging engagements of the pins 143. The pitch of the thread within the die now draws the latter forward and the pins 143 also draw all parts forward until the thread of the screw is finished. Just at this time gear 150 strikes forward standard 118, or a stop 145 therein, and further forward movement of the die holder forcibly disengages the pins 143, and the die continues to revolve with the screw being made. The spring 120 now returns the clutch member 128 and connected parts to the left, which causes the gear 150, by engaging the shoulder 152, to compress the spring 154 and move the long gear 151 to the left. This causes the ratchet teeth 156 to be disengaged and said member 128 to reëngage with the rapidly rotating gear 134, and the latter causes an accelerated rotation of the spindle and die in the same direction as that of the live spindle so that the die is drawn off of the screw just finished and all parts returned to the position shown in Fig. 2. Not only is this arrangement simpler than in my previous patent above referred to, but it accomplishes a gain in the speed of the machine, because as the die is run more slowly the machine can be run more rapidly—thus increasing the output.

What is claimed as new is:

1. In a screw-making machine, the combination with the live- and die-spindles, a clutch member splined on the latter, a second clutch member loose thereon, a power shaft, and gearing between it and said second member for rotating the latter faster than said shaft; of a sleeve loose on the spindle, clutch pins between the sleeve and spindle, means for moving said first member and sleeve forward and backward to alternately engage and disengage the two clutches, a large gear fast on the sleeve, a smaller gear engaging it and loose on the shaft, and connections between said gear and shaft for limiting the rotation of the small gear to that of the shaft after the said first-mentioned clutch members have disengaged.

2. In a screw-making machine, the combination with the live- and die-spindles, a clutch member splined on the latter, a second clutch member loose thereon, a power shaft, and gearing between it and said second member for rotating the latter constantly; of a sleeve loose on the spindle, clutch pins between the sleeve and spindle, means for moving said first member and sleeve forward and backward to alternately engage and disengage the two clutches, a large gear fast on the sleeve, a smaller gear engaging it and loose on the shaft, a collar fast on the shaft, ratchet teeth on adjacent faces of said collar and small gear, and mechanism for engaging said teeth after said first-mentioned clutch members have disengaged.

3. In a screw-making machine, the combination with the live- and die-spindles, a clutch member splined on the latter, a second clutch member loose thereon, a power shaft, and driving gearing between it and said second member for rotating the latter constantly; of a sleeve loose on the spindle, clutch pins between the sleeve and spindle, means for moving said first member and sleeve forward and backward to alternately engage and disengage the two clutches, a large gear fast on the sleeve, a smaller gear engaging it and loose on the shaft, a collar fast on the shaft, ratchet teeth on adjacent faces of said collar and small gear, and a spring on the shaft between said driving gear and smaller gear for engaging said teeth after said first-mentioned clutch members have disengaged.

4. In a screw-making machine, the combination with the live- and die-spindles, a clutch member splined on the latter, a second clutch member loose thereon, a power shaft, and gearing between it and said second member for rotating the latter constantly; of a sleeve loose on the spindle, clutch pins between the sleeve and spindle, means for moving said first member and sleeve forward and backward to alternately engage the two clutches, a large gear fast on the sleeve, a smaller gear engaging it and loose on the shaft, a collar fast on the shaft, ratchet teeth on adjacent ends of said collar and small gear, a shoulder at the other end of the latter, and a spring pressing the shoulder normally against the rear side of the large gear whereby its forward movement permits said teeth to engage after said first-mentioned clutch members have disengaged.

5. In a screw-making machine, the combination with the live- and die-spindles, a clutch member splined on the latter, a second clutch member loose thereon, a power shaft, a driving gear mounted thereon and having a pocket in one end, and teeth between it and said second member for rotating the latter constantly; of a sleeve loose on the spindle, clutch pins between the sleeve and spindle, means for moving said first member and sleeve forward and backward to alternately engage the two clutches, a large gear fast on the sleeve, a smaller gear engaging it and loose on the shaft, a collar fast on the shaft, ratchet teeth on adjacent ends of said collar and small gear, a shoulder at the other end of the latter adapted to enter said pocket, and a spring coiled on the power shaft within the pocket and pressing the shoulder normally against the rear side of the large gear whereby its forward movement permits said teeth to engage after said first-mentioned clutch members have disengaged.

In testimony whereof I have hereunto subscribed my signature this the 27 day of August, A. D. 1907.

FRANK O. CURTIS.

Witnesses:
   F. E. CURTISS,
   S. OSGOOD.